United States Patent [19]
Percy

[11] Patent Number: 5,599,363
[45] Date of Patent: Feb. 4, 1997

[54] VACUUM FILTER BELT APPARATUS

[76] Inventor: Donald W. Percy, 100 Pillsbury Rd., Southview Condo 9 Townhouse, Londonderry, N.H. 03053

[21] Appl. No.: 283,567

[22] Filed: Aug. 1, 1994

[51] Int. Cl.⁶ ........................................ B01D 46/20
[52] U.S. Cl. ................................. 55/352; 55/354
[58] Field of Search .................... 55/351, 352, 354

[56] References Cited

U.S. PATENT DOCUMENTS

| | | | |
|---|---|---|---|
| 2,963,112 | 12/1960 | Cawthon et al. | 55/351 |
| 3,098,731 | 7/1963 | Greene et al. | 55/351 |
| 3,117,849 | 1/1964 | Selke | 55/354 |
| 3,332,215 | 7/1967 | Revell | 55/352 |
| 3,552,098 | 1/1971 | Cochran | 55/351 |
| 3,985,528 | 10/1976 | Revell | 55/352 |
| 4,054,521 | 10/1977 | Winzen | 55/352 |
| 4,221,576 | 9/1980 | Phillips, Jr. | 55/352 |
| 4,435,909 | 3/1984 | Williamson, Jr. | 55/352 |

FOREIGN PATENT DOCUMENTS 231895  3/1959  Australia.

OTHER PUBLICATIONS

Perry's Chemical Engineers' Handbook, 6th Ed., McGraw–Hill, 1984; Don W. Green, editor; pp. 20–107 to 20–109.

*Primary Examiner*—Thomas R. Weber
*Attorney, Agent, or Firm*—Ross, Ross & Flavin

[57] ABSTRACT

In a gas cleaning apparatus a filter belt is arranged to move in a flight path across and transverse to a gas flow stream so that successive incremental portions of the filter belt enter the gas flow stream at an entrance point, pass thereacross, and then leave it at an exit point, with and means for moving the successive incremental portions of the filter belt in seriatim into and out of the gas flow stream.

1 Claim, 6 Drawing Sheets

VACUUM FILTER BELT APPARATUS

BACKGROUND OF THE INVENTION

1. Field of the Invention

My invention relates to an apparatus for the filtration of contaminants in an air or gas flow stream and more particularly to a filter apparatus, automatically or manually operated, which employs a movable belt of filter medium with successive portions being traversed in seriatim transverse to the path of the air or gas flow stream being treated.

A filter is provided which presents a clean filtering area to an air or gas stream, the filtering area presented requiring a minimum of space and offering a maximum of resistance to the treated stream. The filter serves to capture and retain the contaminents in the stream.

More particularly, the invention provides an air or gas cleaning apparatus comprising a filter belt arranged to move in a path transverse to the air or gas flow stream being treated, so that successive portions of the filter belt are entered into the area of the flow stream at an entrance point, passed thereacross, then leave it at an exit point, together with means for moving in seriatim successive increments of the filter belt into and out of the flow stream.

2. Description of the Prior Art

No U.S. patent has been found, as a result of a preliminary search in the U.S. Patent Office which anticipates the combination of features disclosed in the present invention.

Movable filter belts cooperating with a vacuum chamber were found but each seems to lie in horizontal disposition and include:

| | |
|---|---|
| Gerber et al | 3,790,154 of Feb. 5, 1974 |
| Pashaian et al | 3,506,128 of Apr. 14, 1970 |
| Deal et al | 4,081,375 of Mar. 28, 1978 |
| Percy | 4,704,143 of Nov. 3, 1987 |

The last cited patent, my own, shows the use of filter elements of differing porosities, which feature appears as a part of the present invention, but not, in the reference, in combination with an automatically or manually movable filter element.

SUMMARY OF THE INVENTION

The filter apparatus employs a movable belt of filter medium, wherein successive portions are transported across the path of the flow stream being treated. That is, successive portions of the filter belt are caused to enter the area of the gas flow stream at an entrance point, pass thereacross, then leave it at an exit point, then to pass through a secondary series of back-to-back reticulated foam filter elements of differing porosities, before exiting the area of the stream to accomplish the capture of the unwanted elements in the stream before discharge to the supported component.

DESCRIPTION OF THE PREFERRED EMBODIMENT

Figure 1:
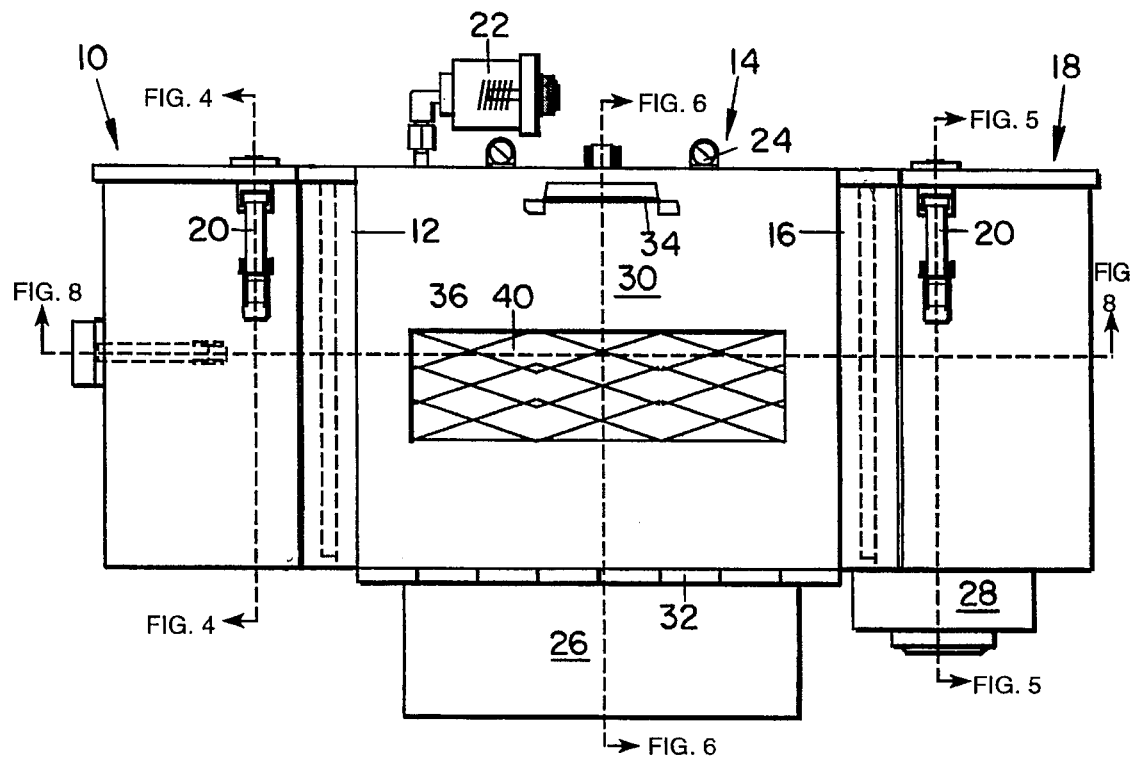
FIG. 1 is a frontal view of the apparatus of the invention.

With reference first to FIG. 1, same being a side elevational view of the front of the apparatus, the invention contemplates, in broad concept, a roll of a clean filter belt being initially stored in a vertical position, in a storage cannister 10, to the leftward end in the showing, and paid out therefrom through a vertical slot 12 in the cannister wall, for transport across the face of a central filtering assembly 14, and thence for further transport through a vertical slot 16 in a takeup cannister 18, to the rightward end in the showing, for windup around a vertical winding tube therewithin.

The storage cannister is for the storage of a new or clean filter medium, the filter belt, prior to pay out, and the takeup cannister is for collecting, in a roll up manner, the filter belt following its service as the filtering medium.

As will appear the automatic feature allows the periodic changing of that portion of the filtering area of the belt directly exposed to the vacuum, as that portion becomes dirtied, all without the manual efforts of a maintenance man.

As will also appear, a safety feature is provided with the addition of a hand crank wherewith the maintenance man or operator of the power plant may effect the traverse of the belt across the filtering area in the event of a failure in the automatic system.

The filter belt is formed from a 100% polyester needle punched nonwoven fabric with a demonstrated capacity for arresting and retaining any foreign abrasive matter (e.g. dirt) from the air or work being drawn therethrough under the influence of a vacuum means.

The belt material is of a tough fibrous texture not subject to tearing or pulling apart, a characteristic so common to the pleated paper type of filter medium in conventional use today.

The belt is readily removable for replacement purposes and is easily washable for reuse purposes and without any deterioration of the product.

The belt functions to hold the submicroscopic contaminates floating in the stream being cleansed so as to deny passage thereof to the working parts of the power plant being served.

The belt, in a vertical disposition, is arranged to feed from its initial position as a roll in the storage canister and to move in a lateral flight path across an air or gas flow stream which is being pulled through the filtering assembly by a vacuum means. Successive initially clean increments of the belt are entered into the flow stream, and are eventually existed therefrom for windup on a spool within the takeup canister, for collection as a spool around a rotating collecting tube within the takeup canister.

Further with reference to FIG. 1, clamps 20 are provided on the cannister side walls for releasably connecting the top wall of each cannister to its respective side wall.

A restriction indicator 22 is mounted on the top of the filtering unit.

Adjusting screws 24 are likewise mounted on the top of the filtering assembly, and could be mounted on a dashboard of a vehicle for the operator's ready observation.

A stand 26 is provided upon which the entire assembly may be mounted. The stand may be individually fabricated and modified to accommodate to the equipment with which the invention is to be adapted.

A motor 28 is mounted below the takeup cannister.

In actuality, a wall 30 in the filtering assembly 14, functions as a hood hinged at 32 along its lower horizontal edge for swinging movement and a handle 34 serves to allow access into the front of the filtering assembly by way of the draw down of wall 30.

The bottom of hood 30 is open for the entrainment therewithin of the air or work to be filtered.

A window 36 in hood 30 allows viewing of filter belt 40 therebehind and movable therepast.

Figure 2:
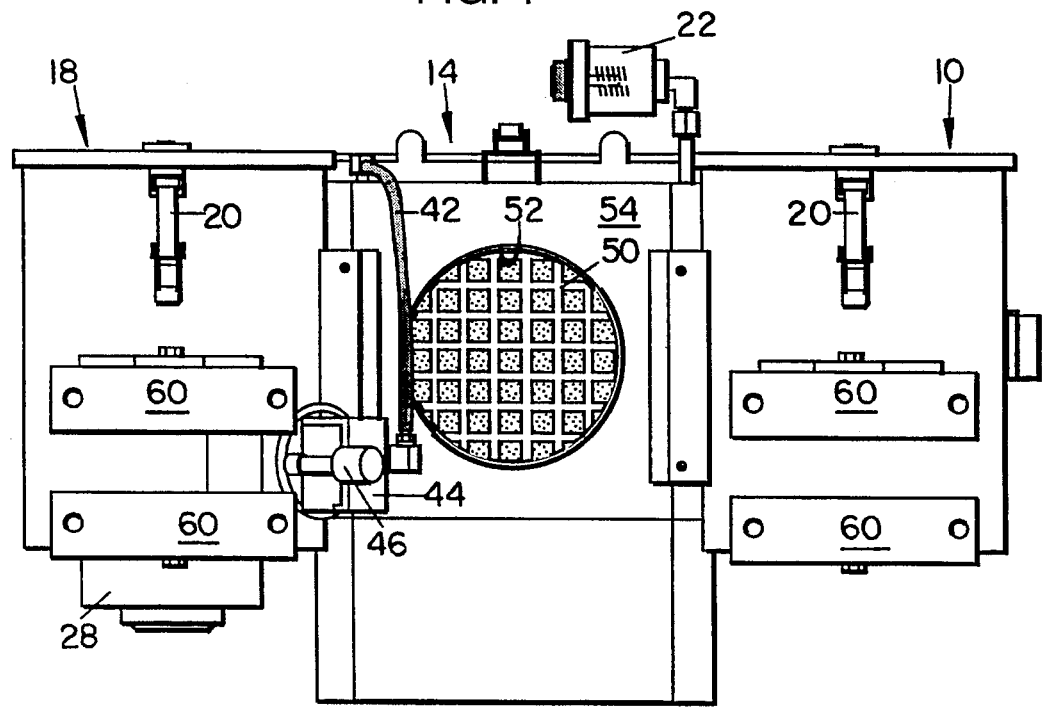
FIG. 2 is a view of the back side of the apparatus.

Reference is now made to the rear view in side elevation, FIG. 2.

A connecting tube 42 leads to a differential control valve 44 mounted on the exterior rear wall 43 of filter assembly 14, the valve functioning responsively to the degree of vacuum within the apparatus.

A grill 50 is provided over a central opening 52 in rear wall 46.

Mounting brackets 60 are provided for mounting the apparatus on the engine or other equipment being served.

Figure 3:
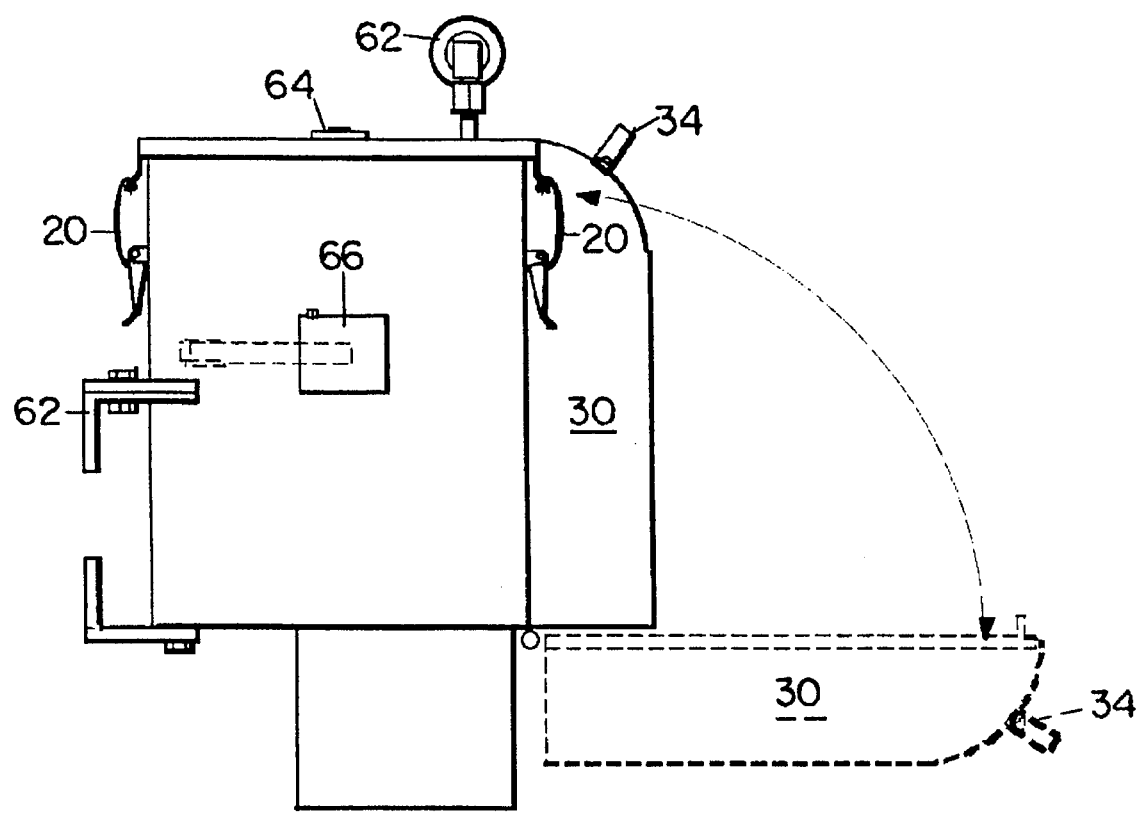
FIG. 3 is a left end view of the apparatus.

FIG. 3 shows the leftward end or side of the apparatus, with hood 30 being shown by dash lines in a pivoted-downward or opened position.

A spring biased feeler follows the roll of belt material as same is called forwardly by the automatic or manual means to be described.

When the roll of belt material is fully depleted, the tail is pulled away from its core 76, the adhesive tape securing same to the core being pulled away from the core by the forward pull on the belt.

The feeler then makes contact with the core and energizes a signal 66 indicating belt depletion.

Figure 4:
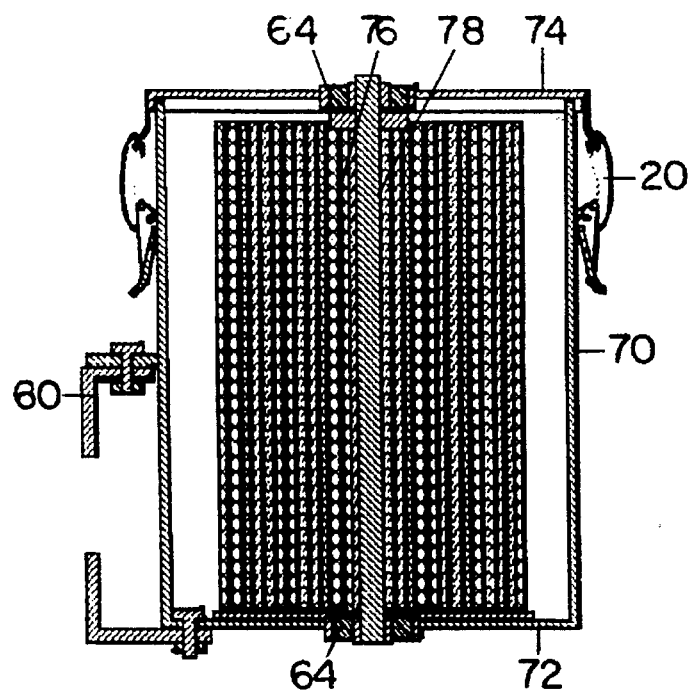
FIG. 4 is a sectional view on line 4—4 of FIG. 1.

In FIG. 4, the cannister is shown as comprising a circular side wall 70, a bottom wall 72, and a separable top wall 74 held relative to the side wall by clamps 20. Filter belt 40 is wound up as a roll having a central opening of a diameter such as to allow the reception of the roll over a central core 76 sleeved upon a central shaft 78 journalled at its opposite extremities on bearings 64.

Figure 5:
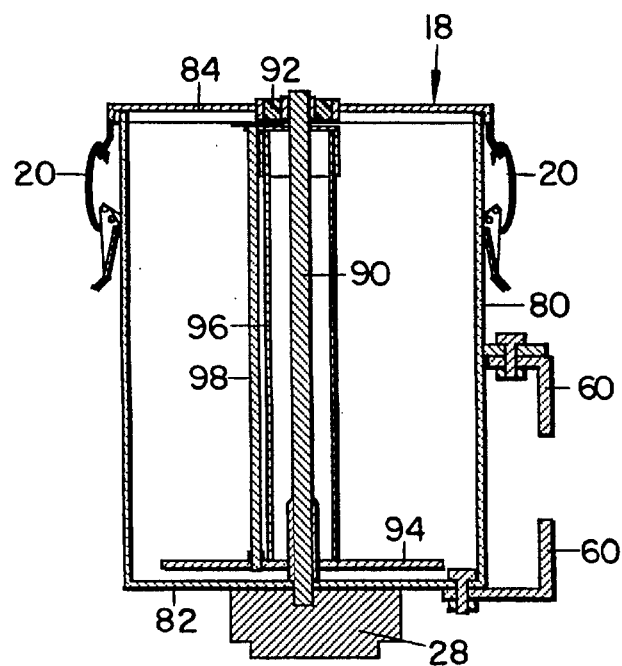
FIG. 5 is a sectional view on line 5—5 of FIG. 1.

Reference is now made to FIG. 5, a sectional view through takeup cannister 18, comprising a circular side wall 80, a bottom wall 82, and a separable top wall 84 held to the side wall by conventional clamps 20.

An arbor or drive shaft 90, centrally and vertically disposed within the cannister, is journalled in a bearing 92 and is directly connected at its lower extremity to motor 28 for the rotatable driving thereof.

A bottom spool plate 94 circumscribes drive shaft 90 upwardly of bottom wall 82.

A spool 96 is sleeved upon drive shaft 90 and mounts a loop rod 98 for receiving the leading looped end Of the filter belt when passed thereto and slipped thereover.

Figure 6:
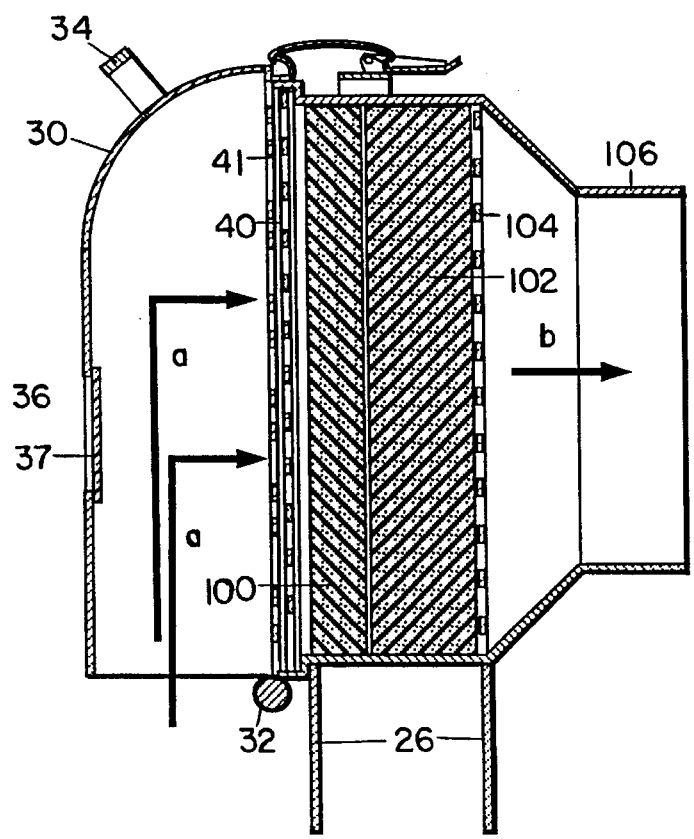
FIG. 6 is a sectional view on line 6—6 of FIG. 1.

With reference now to FIG. 6 a sectional view on line 6—6 of FIG. 1, with the front of the apparatus being leftward and the rear of the apparatus being rightward.

Wall 30 is shown with a grill 37 over window 36.

A portion of filter belt 40 is represented as located in operating position within the filter assembly and being guided thereto as by top and bottom tracks.

A grill 41 is located forwardly of the filter belt for supporting and holding same strategically in situ as the air or work being filtered is drawn through the grill and into and through the filter belt.

As aforesaid, the air or work being filtered is pulled upwardly through the hood and same is represented by arrows a, then is drawn through the grill and through the filter belt for the cleansing function.

Outboard of and adjacent the filter belt, a series of filter elements 100 and 102 is so positioned that all air or work being served is caused additionally to be drawn therethrough following passage through the filter belt.

Each filter element is comprised of a reticulated airfoam "honeycomb" material consisting of a three-dimensional network of interconnecting strands of a polyurethane resin.

Each element abuts or confronts its neighbor and is longitudinally with the others.

Each varies in porosity from the most coarse to the finest porosity in the direction of air flow through the filter.

The variations in thickness and in porosity may be made to accommodate to the work loads normally encountered with the equipment to which the invention is adapted.

A typical configuration might consist of two elements 100 and 102, as shown, having respective porosities of 40 and 80 pores per inch (PPI) and respective thicknesses of ⅝" and 2½".

While the numbers of such elements may vary, two are shown merely for exemplification.

Another typical configuration, as for instance, for a truck engine might consist of three elements, each 10" in diameter, having respective porosities of 30, 60 and 80 PPI, and respective thicknesses of 1⅜", ¼", and ¼".

On the other hand a cement machine filter configuration might consist of filters 4 ½" thick.

One particular advantage in the system is that in the unhappy event that the filter belt is "lost", still available for the filtering function are elements 100 and 102.

In certain cases, especially where the contaminants may be particularly fine, the surfaces of reticulated foam filter elements 100 and 102 may be fully or partially impregnated from back to front (i.e. against the air flow direction) with a petroleum-based agent such as Visilube. For example, a truck engine filter system may be impregnated on the back end only, while a cement machine filter may be fully impregnated. The impregnation helps the filter to more efficiently trap an optimal amount of contaminants as they flow toward the engine.

Outboard of the filter series 100 and 102, another grill 104 supports the filters so as to hold them snugly in confrontation with each other and with the filter belt.

The filtered air is pulled by the vacuum from the equipment being served within cowling or air tube 106 for directing the cleansed air to the engine or power plant blower in the direction indicated by arrow b.

The assembly is connected to the air inlet of the blower, turbo, or power plant being served and is powered by the exhaust pressure of such equipment so as to cause the air to be sucked first through the filter belt and second through the series of filter elements.

For example, the blower may call for 1000 cubic feet of air per minute so as to cause 1800 rpm of the engine or power plant.

The air being pulled through the belt by the vacuum slows the flow rate of the air to the blower. Same leads to a build up of the vacuum causing a rise on the dial indicator.

Incidentally, such indicator could as easily be mounted on a tractor or other equipment.

Figure 7:
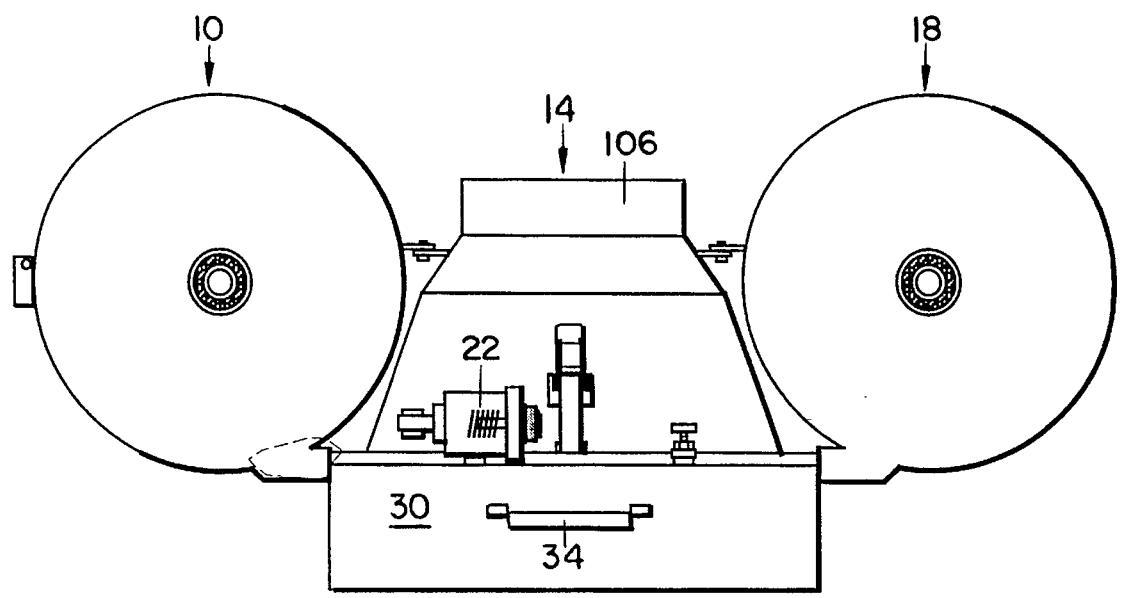
FIG. 7 is a view in top plan of the apparatus.
Figure 8:
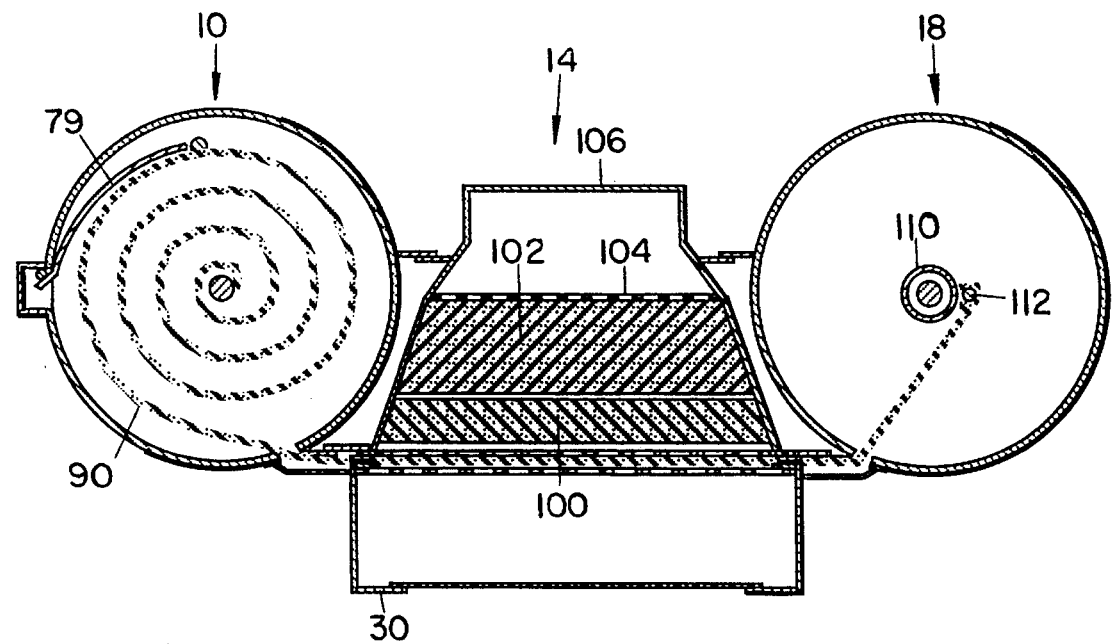
FIG. 8 is a sectional view on line 8—8 of FIG. 1.

FIG. 7 is a showing in top plan of the equipment of the invention and FIG. 8 is a sectional view through the midsection of the equipment as shown in FIG. 7.

The roll of belt 40 is seen to be wound around central core 76 which is sleeved upon central-shaft 78. The trailing end of the belt is releasably held to the central core by an adhesive tape (not shown) so that when the tail of the belt is reached, it is readily released from its position relative to the central core by virtue of the forward pull on the belt, all whereupon a spring biased feeler 79 which has been held firmly against the depleting roll of the belt as payout ensues is now pushed into contact with central shaft 78 so as to energize signal alarm 66 (see FIG. 3) signalling the depletion of the roll of filter belt.

In the takeup canister, a winding tube 110 is disposed centrally of the canister. A loop rod 112 is in parallel disposition therewith and spaced therefrom, the loop rod being designed to receive the looped end at the leading end of the belt.

A cap 114 has a friction fit with the top of the winding tube upon which it is sleeved.

Figure 9:
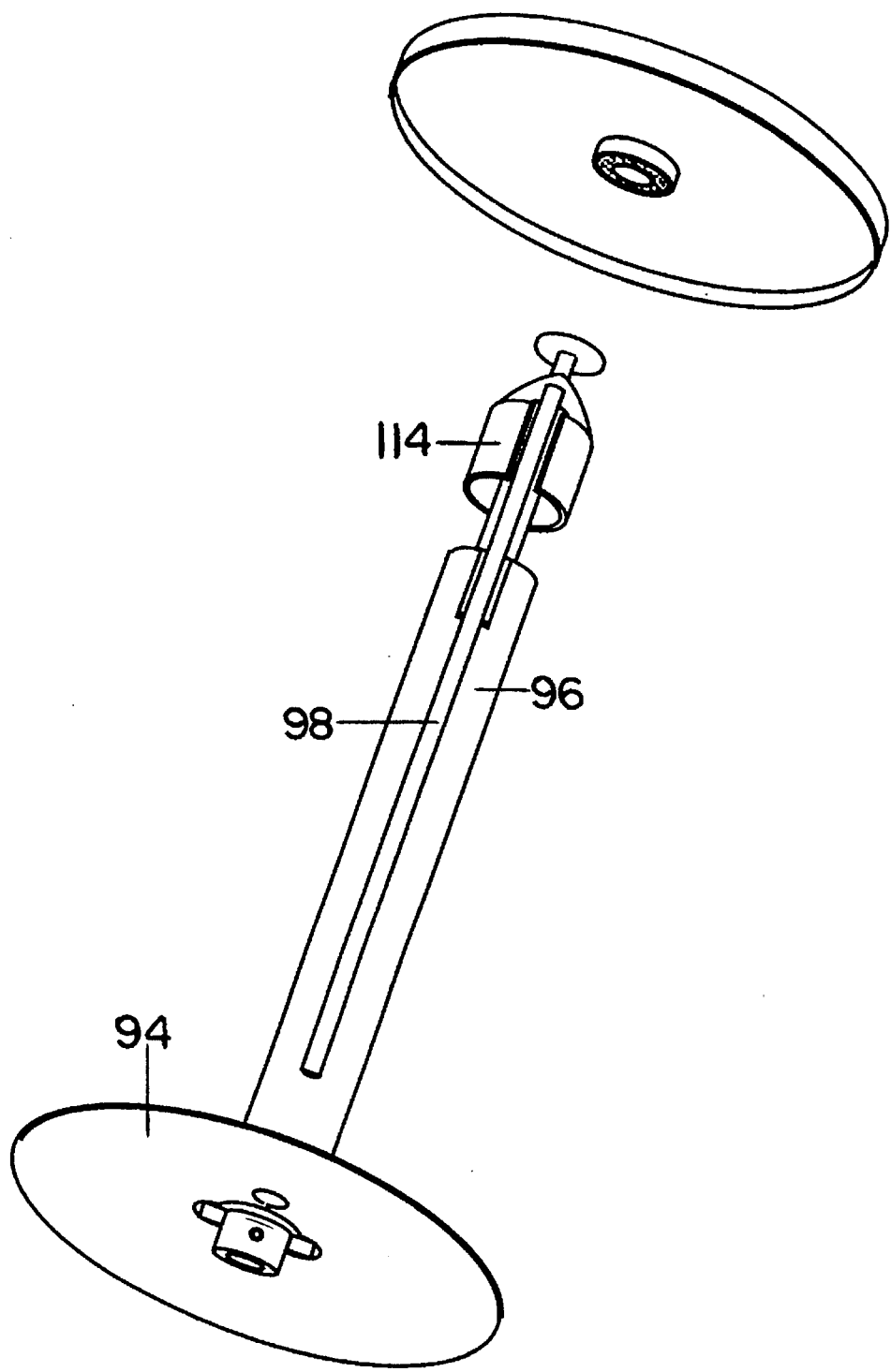
FIG. 9 is an exploded perspective view of the internal assembly of the take-up cannister.

Reference is now made to FIG. 9, showing the takeup cannister winding subassembly in exploded isometric projection same serving the function of the winding up of the filter belt passed thereto.

As the surface of the portion of the filter belt in operating position in the filter assembly accumulates foreign matter, a restriction control 20 records such buildup.

As soon as there is a restriction equal to the presetting of the control, motor 28 is energized so as to rotate the takeup assembly drawing the belt forwardly through the filter assembly until a clean area of the filter belt is positioned across the face of the housing, whereat the restriction reading is back to a zero and the motor is then stopped by the control.

Figure 10:
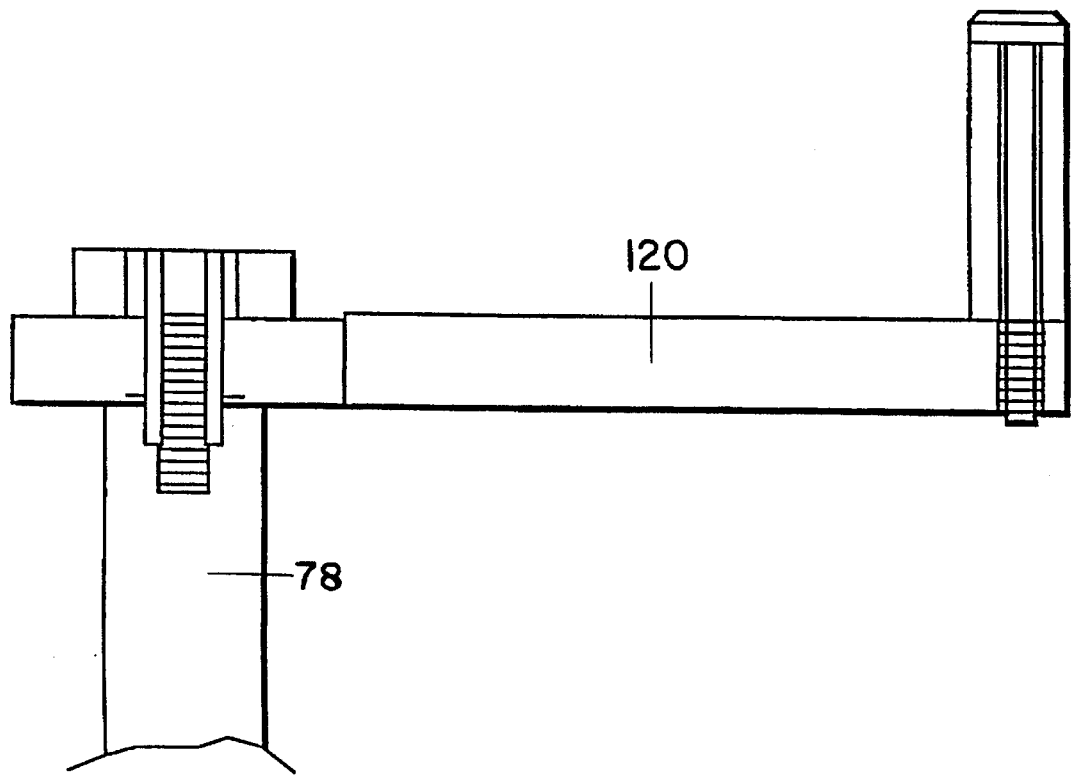
FIG. 10 is an enlarged view in side elevations of the hand crank means useful in driving the filter belt forwardly in the event of a failure of the motor or other break down in the automatic features of the invention.

In FIG. 10, I have shown a hand crank 12 which may be mounted on top of the takeup canister and connected to drive shaft 90 for effecting manually the rotation of spool 96 in the event of any failure of the automatic mechanism to function.

Too, the hand crank may be called into use merely for the convenience of the operator who for any reason may desire to bring a clean position of the belt into the gas cleansing work area.

Operationally, vacuum indicator 22 gives a visual indication as to how much vacuum is drawing the gaseous stream through the filter area and is for the convenience of the operator making a visual inspection.

As particulate matter is impacted on the inboard face of the belt, the control means records the buildup taking place as a function of the variation of the suction drawing on the outboard side of the belt. The control means responsively and respectively generates and ceases to generate signals as the vacuum is at a predetermined maximum level, for energizing the drive means and drawing the used portion of the belt forwardly, and at a predetermined minimum level, for deenergizing the drive means with a resultant positioning into place of a new portion of the belt.

That is, the vacuum ascends toward its maximum in direct ratio with the contamination of the belt, and with a minimum of vacuum existing as the confronting portion of the belt is new or clean.

The embodiments of the invention in which an exclusive property or privilege is claimed are defined as follows:

1. In a filter device in fluid communication with the vacuum means of an engine serviced thereby and including:

a housing having an upstream fluid inlet and a downstream fluid outlet defining a flow passage therebetween, a charge of filter medium sequentially movable along a vertical flight path from one side of to the other side of the housing, support means for supporting a portion of the filter medium across and transversely of the flow passage, a supply canister and a takeup canister at opposite sides of the flow passage, a supply spool rotatably mounted within the supply canister for loading the charge of the filter medium thereinto and the payout of the filter medium therefrom, a takeup spool rotatably mounted within the takeup canister for the takeup of the filter medium thereon, a motor for driving the takeup spool, a primary grill having inboard and outboard faces and being extendable transversely of and through the flow passage forwardly of the filter medium for retaining the filter medium in confronting position against the inboard face of the grill, plural adjacent layers of reticulated polyurethane foam of varying pore densities positioned as a supplemental filter medium intersecting the flow passage outboard of the outboard face of the grill with the foam layer nearest the primary grill having a porosity of 40 pores per inch and the layer farthest from the primary grill having a porosity of 80 pores per inch, a secondary grill having inboard and outboard faces and being extendable transversely of and through the flow passage with its inboard face being outboard of the foam layers for holding the foam layers against each other and relative to the primary grill, the engine vacuum means communicating with the fluid outlet for drawing the fluid stream through the filter medium and supplemental filter medium, sensing means including a presettable control means cooperant with the engine vacuum means for monitoring the concentration of contaminants collected on the filter medium as a function of the vacuum drawing on the filter medium and responsively generating and ceasing-to-generate signals respectively as the sensing of the contaminant concentration reaches maximum and minimum levels respectively for energizing and deenergizing the motor respectively and driving and stopping the takeup spool respectively in effecting the incremental movement of the filter medium with respect to the flow passage for replacing a spent portion of the filter medium with a fresh unspent portion across the flow passage.

\* \* \* \* \*